Oct. 14, 1952  H. V. A. BONIN  2,613,671
NIPPLE AND CAP CONSTRUCTION
Filed April 19, 1949
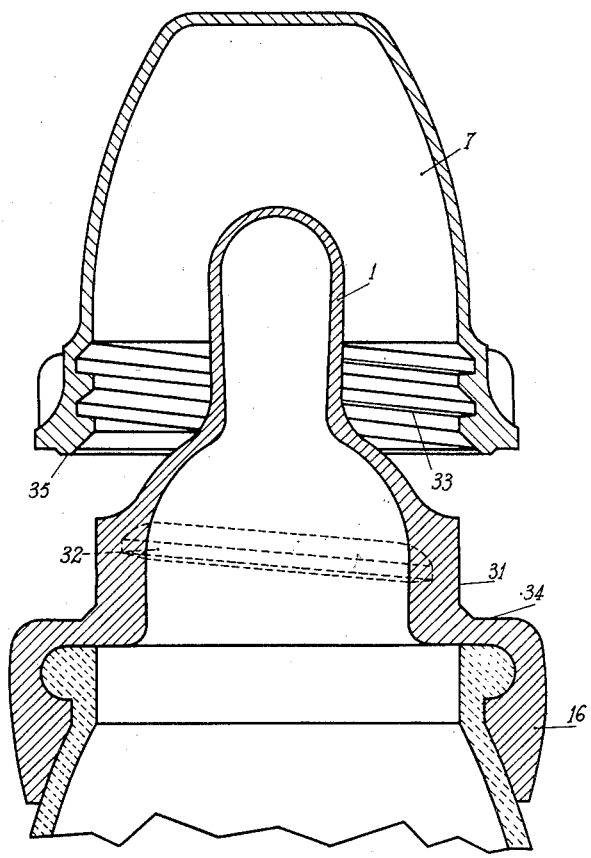
Inventor:
Henri Victor Armand Bonin
By: Wenderoth, Lind &
Ponack
Attorneys Patented Oct. 14, 1952

2,613,671

UNITED STATES PATENT OFFICE 2,613,671

NIPPLE AND CAP CONSTRUCTION

Henri Victor Armand Bonin, Paris, France

Application April 19, 1949, Serial No. 88,432
In France April 23, 1948

1 Claim. (Cl. 128—252)

This invention relates to feeding-bottles. The food administered to bottle-fed infants should be strictly sterile. Sterilization of feeding-bottles and of the milk contained therein is generally accomplished in a different manner depending on whether fresh or condensed milk is used. Where natural or fresh milk is used, it is necessary to sterilize both the feeding-bottle and the milk and this is usually done by immersing the filled feeding-bottle covered with its rubber nipple or with a sealed rubber cap into a container containing water which is caused to boil.

Where on the other hand condensed milk is employed, which is commercially provided in sterile condition in its can, it is only necessary to sterilize the feeding-bottle, its nipple and cap, and this may be effected by immersing these assembled elements into boiling water. After that predetermined amounts of boiled water and condensed milk are placed into the bottle to feed the baby therefrom.

In either instance, some time always elapses between the preparation of the feeding-bottle and its use; sometimes several bottles are prepared at the same time; at other times, where a single bottle is prepared, it is necessary to wait for it to cool, or again, the mother or nurse may take the bottle with her to administer to the baby during an outing. In any such case, there is always the risk that the nipple might become contaminated and that harmful germs from the atmosphere might penetrate into the milk and there develop and thrive with excessive rapidity since that milk in the temperature-range of from 30° C. to 50° C. at which it is used provides an extremely favorable nutrient medium for such germs.

It is, accordingly, extremely desirable to provide feeding-bottles with means adapted to maintain in sterile condition both the milk contained therein and the nipple of the bottle until such time as the filled bottle is used to feed the baby, by confining the assembled feeding-bottle and nipple in a sealed enclosure. Numerous devices have been proposed for this purpose and have been known for many years. Most such prior devices comprise a cap adapted to be fitted over the nipple and tightly engage the sides of the bottle to form a tight seal between said cap and the nipple. This invention provides improvements over such prior protecting devices.

Thus, it is an object of the invention to provide improved protecting means for maintaining in sterile condition the nipple and contents of a feeding-bottle prior to use.

It is another object to provide, for use on a conventional feeding bottle, a new and improved combination of a nipple and protecting cap provided with cooperating means therein whereby said cap may be easily inserted over said nipple in place on said bottle to provide a tight, positive and safe seal both between said bottle and said nipple and between said nipple and said cap, and then may just as easily be removed from said nipple at the time of use.

With the above and other hereinafter-appearing objects in view, the invention provides a nipple, means on said nipple for tightly engaging the flange of a conventional feeding-bottle, a protecting cap and cooperating interengaging means between said nipple and said cap providing, upon insertion of the cap over the nipple, a tight seal therebetween. The protecting cap may be made of any suitable material such as metal, plastics, and the like.

To provide a clear understanding of the invention, some exemplary forms of embodiment thereof will now be described by way of illustration and not of limitation. In the accompanying drawing, The figure is an axial cross-sectional view of the construction of the invention.

As shown in the figure, the nipple 1 is formed at its base with a greatly thickened section of rubber 16 adapted to be retained firmly in place over and around the feeding-bottle under the tension provided as a result of the fact that the external diameter of the mouth-flange or bead of the bottle is substantially larger than the original diameter of the annular groove or recess of the nipple adapted to engage said bead, in the normal undeformed condition of said nipple prior to its being fitted over the bottle.

According to the embodiment shown in the figure, the bosses of the nipple are provided by partial thread projections or helical ramp surfaces; these inclines 32 are equal in number to the internal projections of the cap which are the internal helical threads at the inner and lower part of the cap 7. Thus the cap is screwed over the base of the nipple, and the elastic distortion of the threads 32 of the nipple force the annular base 35 of the cap into tight sealing engagement against the annular nipple base 34.

Further according to the invention, the base of the cap may be made to engage the base of the nipple actually through a screw-connection including one or more threads. Such an embodiment is illustrated in the figure. As shown, the nipple 1 supports on a substantially cylindrical portion 31 thereof, by means of the partial thread projections 32 disposed symmetrically with respect to each other on opposite sides of the centre axis. The nipple base 16 is provided with a large cross-sectional dimension so as to engage tightly the flange of the feeding-bottle and provide a supporting-surface 34 for the cap. The cap 7 is formed with screw-threads 33 so that upon screwing the said cap over the nipple, the threads 33 are threaded into the inclines 32, and a firm clamping engagement is produced between the cap and the nipple, this clamping engagement acting between the margin 35 of the cap and the supporting surface 34.

It will be understood that the invention is in no manner limited to the specific embodiments described and illustrated, and that in particular many other variant means may be conceived for obtaining the desired clamping engagement between the cap and the nipple. Thus screw-means with complete or interrupted threads may be used, tenon-and-mortise assemblies with inclines, and numerous equivalent means may also be easily designed by those familiar with the art.

What I claim is:

In a feeding-bottle assembly, in combination, a bottle with an outward flange at the mouth thereof, a nipple having an outward flange at its cylindrical base and provided with an increased radial thickness of rubber at its base, said nipple provided with a circumferential inturned flange defining an internal groove adapted to fit over said bottle mouth flange under substantial tension, a flat annular top seating surface on the base of said nipple above the level of the bottle mouth flange, a protecting cap for said nipple provided with inwardly threaded screw threads at the base thereof and cooperating interengaging means at the cylindrical base of said nipple constituted by oppositely placed partial thread projections of said nipple which interengage with the inwardly threaded screw threads at the base of said cap to tightly seal the cap to the nipple above the level of the bottle mouth flange and to provide a pressure against the outward flange of the nipple which is parallel to the axis of the bottle.

HENRI VICTOR ARMAND BONIN.

REFERENCES CITED

The following references are of record in the file of this patent:

UNITED STATES PATENTS

| Number | Name | Date |
| --- | --- | --- |
| 976,887 | Ladley | Nov. 29, 1910 |
| 1,018,831 | Ladley | Feb. 27, 1912 |
| 1,258,766 | Gullery | Mar. 12, 1918 |
| 1,425,532 | Marr | Aug. 15, 1922 |
| 1,451,822 | Hagerty | Apr. 17, 1923 |
| 1,672,734 | Reilly | June 5, 1928 |
| 1,716,262 | Dishart | June 4, 1929 |
| 2,204,683 | Lambert | June 18, 1940 |
| 2,434,611 | Hamiel | Jan. 13, 1948 |

FOREIGN PATENTS

| Number | Country | Date |
| --- | --- | --- |
| 526,333 | Great Britain | Sept. 16, 1940 |